United States Patent
Wang et al.

[11] Patent Number: 6,148,240
[45] Date of Patent: Nov. 14, 2000

[54] METHOD AND APPARATUS FOR PERFORMING AN OPEN-LOOP CURRENT SHAPING FOR SEEKING ACOUSTICS REDUCTION IN A DISK DRIVE

[75] Inventors: Jwo-min Wang, Sunnyvale; Thorsten Schmidt, Milpitas, both of Calif.

[73] Assignee: Quantum Corporation, Milpitas, Calif.

[21] Appl. No.: 09/036,581

[22] Filed: Mar. 6, 1998

[51] Int. Cl.[7] ............... G05B 19/18; G05B 11/01; H02P 1/46; G11B 5/596
[52] U.S. Cl. ............... 700/63; 318/560; 318/701; 360/78.07
[58] Field of Search ............... 360/78.07, 78.06, 360/78.04, 78.09; 318/701, 560; 700/63, 71

[56] References Cited

U.S. PATENT DOCUMENTS

| | | | |
|---|---|---|---|
| 4,916,635 | 4/1990 | Singer et al. | |
| 4,937,689 | 6/1990 | Seaver | 360/78.07 |
| 5,262,907 | 11/1993 | Duffy | 360/77.05 |
| 5,291,110 | 3/1994 | Andrews | 318/560 |
| 5,444,583 | 8/1995 | Ehrlich | 360/78.09 |
| 5,465,034 | 11/1995 | Andrews | 318/560 |
| 5,638,267 | 6/1997 | Singhose | 364/148 |
| 5,696,647 | 12/1997 | Phan | 360/78.07 |
| 5,852,355 | 12/1998 | Turner | 318/701 |
| 5,901,009 | 5/1999 | Sri-Jayantha | 360/78.07 |
| 5,923,141 | 7/1999 | McHugh | 318/701 |

*Primary Examiner*—William Grant
*Assistant Examiner*—Ronald D Hartman, Jr.
*Attorney, Agent, or Firm*—Beyer & Weaver

[57] ABSTRACT

Methods and apparatus for reducing overall seeking acoustics in a head-disk apparatus are disclosed. In accordance with one aspect of the present invention, a method for reducing overall seeking acoustics in a disk drive includes sending at least one current command sample to a power amplifier, prior to sending a full scale current command to the power amplifier. A seek current wave form with a smooth, non-linear rise is generated using the power amplifier such that the current command sample. In one embodiment, the full scale current command is arranged to cause the power amplifier to saturate. In another embodiment, the initial rise is a smooth, substantially bi-exponential initial rise.

21 Claims, 4 Drawing Sheets

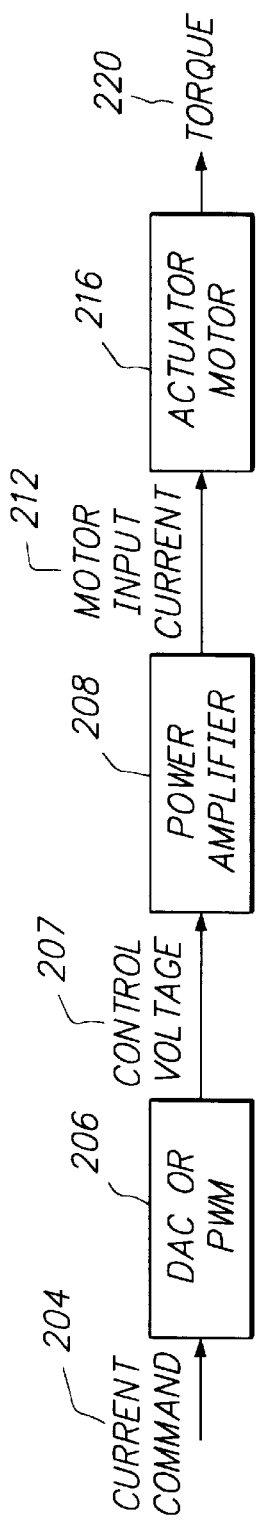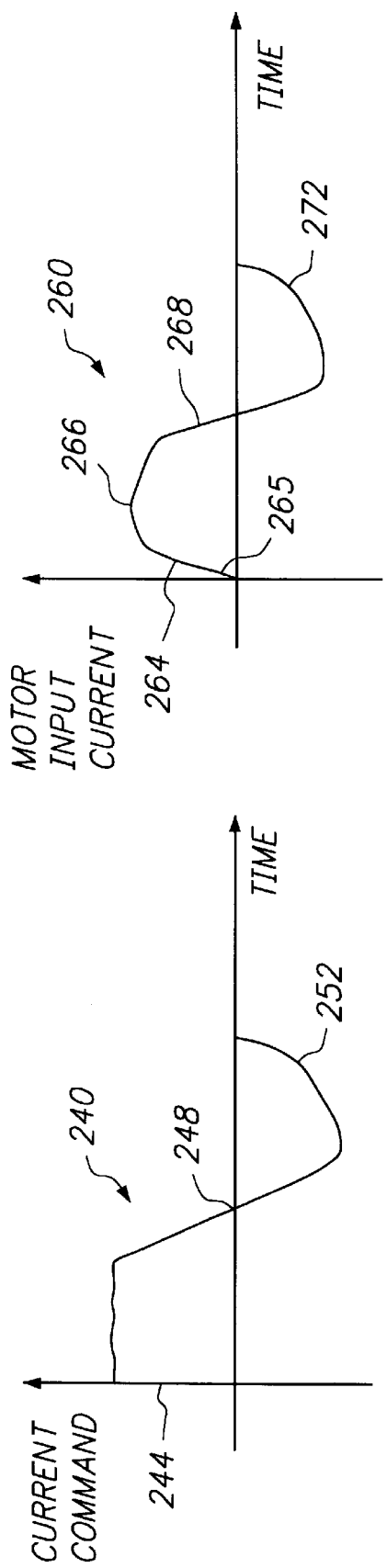

METHOD AND APPARATUS FOR PERFORMING AN OPEN-LOOP CURRENT SHAPING FOR SEEKING ACOUSTICS REDUCTION IN A DISK DRIVE

BACKGROUND OF THE INVENTION

1. Field of Invention

The present invention relates generally to methods and apparatus for use in disk drives for computer systems. More particularly, the present invention relates to methods and apparatus for reducing the vibration of high frequency resonance modes associated with seeking acoustics in disk drives for computer systems.

2. Description of the Relevant Art

The reduction of noise, or vibrations, in disk drives is crucial to ensure that performance issues associated with a disk drive may be minimized. When performance of a disk drive is not at an acceptable level, customer dissatisfaction regarding the disk drive may be significant, and the integrity of data stored on the disk drive may be compromised. By way of example, when a disk drive experiences excessive vibration, a customer may perceive the disk drive to be operating in a faulty manner. Therefore, the magnitude of the vibrations experienced on a disk drive must generally be reduced to acceptable levels.

FIG. 1 is a diagrammatic representation of a disk drive assembly suitable for use in a computer system. A disk drive assembly 102, which may also be known as a head-disk assembly (HDA), includes a platter assembly 104 that is situated on a base plate 103. Platter assembly, as shown, includes a platter 105 and a spindle mechanism 106. Spindle mechanism 106 typically includes a spindle bearing 107 which is coupled to platter 105, or a disk. Data is stored, or otherwise encoded, on platter 104. Platter 104 may contain multiple spokes 108, each of which includes encoded position information. That is, each spoke 108 contains track numbers and patterns to determine fractional positions which relate to the location of a disk drive, or read/write, head 120 with respect to platter 104.

Disk drive assembly 102 also includes an actuator assembly 114. Actuator assembly 114 includes an actuator 118 which supports disk drive head 120. Actuator assembly 114 is arranged to move disk drive head 120 to different positions over platter 105 such that data may be retrieved from or stored to different data-carrying sectors of platter 105. In general, when disk drive head 120 is to be moved, torque is generated to pivot or otherwise move actuator assembly 114 by a motor assembly 122. Motor assembly 122 is generally mechanically coupled to actuator assembly 114 through an actuator bearing 124.

Actuator motor assembly 122 often includes a coil structure and a magnetic field which surrounds the coil structure, as will be appreciated by those skilled in the art. In other words, actuator motor assembly 122 typically includes a voice coil motor (VCM). By passing current through the coil structure in a particular direction and for a specified length of time, actuator assembly 114 may be moved, e.g., pivoted, such that disk drive head 120 is positioned over a specific portion of the platter 105. The pivoting of actuator assembly 114 to position disk drive head 120 in a desired position is generally known as a "seek."

A spindle bearing 107, which is coupled to a spindle motor (not shown), allows platter 105 to spin with respect to base plate 103. Typically, noise is associated with the rotation of platter 105. Specifically, motor noise associated with a spindle motor, i.e., "spindle noise," contributes to idle acoustics, or acoustics which are present while platter 105 is spinning. The amount of idle acoustics increases as the spinning speed of platter 105 increases. Further, if spindle bearing 107 is not perfectly circular, spindle bearing 107 may further contribute to idle acoustics.

Although the level of idle acoustics in a disk drive assembly may vary, e.g., the level of idle acoustics may depend upon the mechanical design of the disk drive assembly, idle acoustics are typically in the range of approximately 35 decibels (dB) to approximately 40 decibels when the platter spinning speed is approximately 4000 revolutions per minute (RPM). By way of example, idle acoustics in the range of approximately 37 dB to approximately 38 dB are typically the market requirement for 5.25 inch disk drives which have a spindle speed of approximately 4000 RPM.

Acoustics associated with seeking processes, referred to herein as "additional seeking acoustics," are additive with respect to idle acoustics. In other words, acoustics are affected by both idle acoustics and additional seeking acoustics. Generally, the "sum" of idle acoustics, which are caused by the spinning of platter 105, and additional seeking acoustics, which result from the performance of a seek, is considered to be the overall seeking acoustics.

Additional seeking acoustics are typically the result of disk drive structural vibration induced by the seek current. Current is sent through the VCM, i.e., the VCM that is a part of motor assembly 122, to create a torque which is applied to actuator assembly 114 in order to move actuator assembly 114. FIG. 2a is a block diagram which illustrates a conventional system used to generate a torque starting with a current command that is provided by a seek program. A current command 204 is sent to a digital-to-analog (D/A) converter 206, or a pulse width modulator (PWM) to produce a control voltage 207 which is proportional to current command 204, numerically. Current command 204 is sent to D/A converter 206 which, in turn, feeds control voltage 207 into a power amplifier 208, in response to a seek command, or a request to move an actuator assembly in order to position a disk drive head. Power amplifier 208 processes, e.g., amplifies, current command 204 to generate a motor input current 212, or a seek current.

Motor input current 212 is effectively arranged to produce a torque 220 that causes an actuator to move. Specifically, motor input current 212 causes an actuator motor 216 to create torque 220 that moves an actuator to a desired location. Torque 220 may cause the actuator to accelerate, decelerate, or move at a constant velocity. In other words, motor input current 212 is arranged to generate torque 220 that causes an actuator to rotate to a desired position for the actuator as required by a seek command. The profile of motor input current 212 is dependent upon the profile of current command 204.

In order to move an actuator, e.g., actuator assembly 118 of FIG. 1, efficiently to a desired position, the amount of current sent to the VCM is often adjusted substantially instantaneously, as will be described in more detail below with respect to FIGS. 2b and 2c. While the level of noise associated with the VCM during a seek may be widely varied, the level of noise, i.e., the additional seeking acoustic, is typically in the range of approximately 5 dB to approximately 10 dB in sound power, as for example approximately 7 dB.

In general, acceptable levels of overall seeking acoustics in disk drive assemblies are determined based upon what is considered to be tolerable by customers who use the disk drive assemblies. For 5.25 inch disk drives, an overall seeking acoustic which is no more than approximately 45 dB is generally considered to be acceptable, although an overall seeking acoustic which is less than approximately 40 dB is preferred. However, as overall seeking acoustics are often in the range of approximately 45 dB to approximately 50 dB, many disk drives fail to meet acceptable levels of noise during seek operations. Failure to meet acceptable levels for overall seeking acoustics may lead to disqualification of disk drives by customers, as well as performance issues related to the disk drives.

Additional seeking acoustics result from large changes of amplitude in a motor input current which is used to create a torque on an actuator motor. As will be appreciated by those skilled in the art, changes in seek current are correlated to the amount of noise associated with a seek command. Specifically, a higher level of noise is generally attributed to a more rapid change in a current level.

FIG. 2b is a graphical representation of a relationship between a current command and time. A current command or a series of current commands, as for example current command 204 of FIG. 2a, is provided as an input to D/A converter or a PWM which is in communication with a power amplifier. Current command has a profile 240 which effectively has an infinite "beginning" slope 244, or an acceleration phase. Beginning slope 244 is approximately infinite due to the fact that a rapid increase from zero current to a current level which saturates a power amplifier allows the seek time, i.e., the time associated with a seek operation, to be minimized. The power amplifier is operated at saturation, or in saturation mode, to minimize the seek time associated with performing a seek. In addition to beginning slope 244, current command profile 240 also has a "change in polarity" section 248, followed by an ending deceleration section 252, both of which are associated with gradually returning profile 240 to a level of zero current, thereby ending the seek.

With reference to FIG. 2c, the seek current that is sent to an actuator motor in response to the current command of FIG. 2b, will be described. An input current profile 260 is effectively a seek current, or a forcing function which causes an actuator to move. A seek current is arranged to create a bang-bang seek, or a near bang-bang seek. Such a seek is a seek in which maximum current levels are used to create maximum torque levels to efficiently move an actuator. Input current profile 260 is generated when current command profile 240 is passed through a D/A converter, or a PWM, as well as a power amplifier, and is used to create a torque in an actuator motor. A beginning section 264 of input current profile 260 is "rugged," i.e., has a relatively large slope. As shown, beginning section 264, which is typically the one-third stroke seek, has a substantially exponential shape, after an initial sudden change of slope 265. The ruggedness of beginning section 264 signifies an abrupt change in the motor input current which initiates vibration of the disk drive in addition to the desired actuator movement. Input current profile 260 reaches a maximum value 266 which corresponds approximately to the saturation level for the power amplifier which produces input current profile 260, given current command profile 240 of FIG. 2b. A "polarity reversal" section 268 of input current profile 260 signifies a transition from acceleration to deceleration. An ending section 272 signifies a deceleration which causes the actuator to decelerate and eventually return to rest.

Since the changes in a motor input current, especially the beginning slope of a motor input current, are relatively abrupt, the noise associated with the beginning slope and, hence, the beginning of a seek, is often significant. As such, the additional seeking acoustic present at the beginning of a seek typically causes the overall seeking acoustic to exceed the maximum acceptable level, e.g., the overall seeking acoustic is likely to exceed approximately 45 dB.

Mechanical solutions are often used in order to reduce overall seeking acoustics. Most mechanical solutions use dampers to damp out vibrations. One common mechanical solution that is used to reduce the overall seeking acoustics involves the use of a foam damping layer. A foam damping layer is mounted on surfaces that emit sound waves, as for example on the top cover of a disk drive. Such a foam damping layer is arranged to absorb energy and, therefore, reduce vibrations on the overall disk drive. However, although the use of a foam damping layer is effective to reduce overall seeking acoustics, the use of a foam damping layer reduces overall seeking acoustics by no more than approximately 2 dB. Further, the use of a foam damping layer is expensive, as it is an additional part that is added to a disk drive, and also requires additional manufacturing time to mount the foam damping layer on the disk drive. As such, the use of a foam damping layer is often not desirable, since the costs associated with the foam damping layer are relatively high given the reduction of overall seeking acoustics that is possible using the foam damping layer. However, foam damping layers are often still used to at least slightly reduce overall seeking acoustics.

Another common mechanical solution which is intended to reduce overall seeking acoustics involves the use of rubber pieces within a disk drive. Specifically, rubber pieces are placed within the disk drive between the actuator motor, or the VCM, and the top cover of the disk drive to reduce the relative motion between the VCM and the top cover. Hence, the rubber pieces are intended to reduce overall seeking acoustics by absorbing energy. As was the case with using a foam damping layer, the rubber pieces also do not significantly reduce overall seeking acoustics. For example, the use of rubber pieces generally does not reduce overall seeking acoustics by more than approximately 1 dB. In addition, the use of rubber pieces is expensive due to the fact that the cost associated with creating the rubber pieces, as well as the time associated with accurately positioning the rubber pieces between the VCM and the top cover, is significant with respect to the reduction of overall acoustics attributed to the use of the rubber pieces. Therefore, the use of rubber pieces to absorb energy may be considered to be a less than desirable solution to the problem of reducing the overall seeking acoustics in a disk drive.

Notch filters are also conventionally used to reduce overall seek-induced vibrations in a disk drive. Although notch filters are mostly used to remove actuator resonances for read/write purposes, notch filters reduce seeking acoustics as well. In particular, notch filters are used to shape the current which used by a VCM to generate a torque, i.e., the seek current. As will be appreciated by those skilled in the art, within the audible frequency range, which ranges from approximately 50 Hertz (Hz) to approximately 10 kiloHertz (kH), there are approximately ten resonant modes. Each notch filter is arranged to notch out, or remove, a particular resonant mode. Since each notch filter used increases the level of instability in the overall disk drive, or, more particularly, the servo arrangement associated with the disk drive, only a few resonant modes may be removed from the overall seeking acoustics. It has been observed that no more than three or four notch filters which are arranged to remove three or four resonant modes may be used without significantly affecting the stability of the overall disk drive. As such, only three or four resonant modes may be selected as being resonant modes which are to be notched out. Therefore, since most resonant modes may not be notched out, overall seeking acoustics are not substantially reduced using notch filters. Further, the use of notch filters often increases the seek time associated with performing a seek.

Many techniques which are used to reduce vibrations in general physical systems may also be applied to disk drive systems in order to reduce overall seeking acoustics in the disk drive systems. One technique which is used is known as current shaping. Current shaping techniques process a current command in order to "round out" the resultant real current. That is, current shaping techniques attempt to smooth out abrupt changes in slope. Such current-shaping techniques are often used to reduce the residual vibrations in a given system. One current-shaping techniques is an "input shaper," which is described in U.S. Pat. No. 5,638,267, issued Jun. 10, 1997, which is incorporated herein by reference in its entirety.

Input shaper techniques generally identify some resonant modes, or frequencies, and essentially remove the frequency components from the current commands such that a real current is characterized by a relatively smooth curve. In other words, input shaper techniques are arranged to process current commands, using what is commonly known as an "input shaper filter," such that certain resonant frequencies are removed from the input current commands. In some cases, there are only a few resonant frequencies which are not excited by the resultant real current, i.e., some resonant frequencies remain excitable. To effectively cancel out selected resonant frequencies using an input shaper, a knowledge of the resonance modes of the system being controlled is required.

Input shaper techniques typically do not cause system instability. Hence, input shaper techniques may be used to remove a relatively high number of resonant frequencies. However, input shaper techniques are not readily adaptable for use in disk drive technology. That is, modifying input shaper techniques for use in disk drive systems is often complicated, since servo code associated with disk drive systems is arranged to perform a phase-plane seek, as will be appreciated by those skilled in the art, while input shaper techniques are time-based. As reconfiguring input shaper techniques to perform a phase-plane seek may be complicated and time-consuming, and only selected resonant modes are rendered unexcitable, i.e., the overall seeking acoustics may not necessarily be reduced to an acceptable level, the use of such current shaping techniques in disk drive systems may not be desirable. Additionally, conventional current shaping, and input shaping, techniques also require knowledge of the resonant modes in a particular disk drive system.

In view of the foregoing, what is desired is a method and an apparatus for efficiently and effectively reducing the overall seeking acoustics in a disk drive system. More particularly, what is desired is a method and an apparatus for efficiently generating a smooth motor input current profile for input into an actuator motor during a seek operation, such that the additional seeking acoustics associated with the seek operation fall within an acceptable level.

SUMMARY OF THE INVENTION

The invention relates to methods and apparatus for reducing overall seeking acoustics in a head-disk apparatus. In accordance with one aspect of the present invention, a method for reducing overall seeking acoustics in a disk drive includes sending at least one current command sample to a power amplifier, prior to sending full scale current commands to the power amplifier. A seek current wave form with a smooth, non-linear rise is generated using the power amplifier such that the current command sample is inputted to the power amplifier. In one embodiment, the full scale current command is arranged to cause the power amplifier to saturate. In another embodiment, the initial rise is a smooth, substantially exponential initial rise.

In still another embodiment, sending the current command sample to the power amplifier involves sending in the range of about one to about four current command samples to the power amplifier. In such an embodiment, sending at least one current command sample to a power amplifier includes sending four current command samples to the power amplifier, wherein a first sample defines an inflection point in the seek current wave form and a second sample defines a saturation value in the seek current wave form for the power amplifier.

According to another aspect of the present invention, a method for processing a seek request on a disk drive apparatus that has a power amplifier, an actuator motor, and an actuator assembly, which is moved by the actuator motor, includes receiving the seek request on servo code associated with the disk drive apparatus, and sending at least one current command sample from the servo code to the power amplifier. A current wave form, which is generated using the current command sample and the power amplifier, is sent to the actuator motor such that the current wave form is arranged to cause the actuator motor to move the actuator assembly. In one embodiment, sending the current wave form to the actuator motor includes creating a torque on the actuator such that the torque causes the actuator assembly to move.

In such an embodiment, the torque may create an additional seeking acoustic associated with the disk drive apparatus. The magnitude of the additional seeking acoustic is dependent upon an initial rise in the current wave form sent to the actuator motor.

In accordance with still another aspect of the present invention, a disk drive apparatus includes a platter, an actuator motor, and an amplifier that is coupled to the actuator motor. The amplifier is arranged to generate an input current wave form to drive the actuator motor. The disk drive apparatus also includes an actuator assembly which is moved by the actuator motor, and a servo mechanism arranged to generate at least one current command sample and at least a few full scale current commands, the number of which depends upon the length of a seek. Also included in the disk drive apparatus is a power amplifier which is coupled to the servo such that the power amplifier is arranged to receive the current command sample and to use the current command sample to generate the input current wave form for the actuator motor, The current command sample is specifically arranged to create a smooth initial rise in the input current wave form.

In one embodiment, the smooth initial rise in the input current wave form is arranged to reduce overall seeking acoustics associated with the disk drive apparatus, and has a substantially exponential shape. In another embodiment, the servo mechanism is arranged to generate the current command sample without knowledge of resonant modes associated with the disk drive apparatus.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 2a is a block diagram representation of a conventional digital system used to generate a torque using current commands.

FIG. 2b is a graphical representation of a relationship between a current command and time.

FIG. 2c is a graphical representation of a relationship between a motor input current, generated by the current commands as shown in FIG. 2b, and time.

DESCRIPTION OF THE EMBODIMENTS

The present invention will now be described in detail with reference to a few preferred embodiments thereof as illustrated in the accompanying drawings. In the following description, numerous specific details are set forth in order to provide a thorough understanding of the present invention. It will be obvious, however, to one skilled in the art, that the present invention may be practiced without some or all of these specific details. In other instances, well known structures and process steps have not been described in detail in order not to unnecessarily obscure the present invention.

In accordance with one embodiment of the present invention, an open-loop current shaping command includes a number of current shaping commands which are pre-specified, e.g., specified prior to a seek request. An open-loop current shaping command is a current shaping command that is sent to a power amplifier, through a "converter" such as a digital-to-analog (D/A) converter or a pulse width modulator (PWM), regardless of feedback information from a servo loop, or derivatives of that feedback information. The use of the pre-specified, or predetermined, current command samples allows the resultant seek current to be "smoothed," as will be described in more detail below. That is, by using the pre-specified current command samples, the resultant seek current, or motor input current, has a substantially smooth initial rise, and does not include an initial sudden change of slope to reach a full scale seek current. Therefore, the additional seeking acoustics that result from a seek are such that the overall seeking acoustics are in an acceptable range.

In 5.25 inch disk drives, the additional seeking acoustics are typically in the range of approximately 0 dB to approximately 5 dB, which generally allows the overall seeking acoustics to fall in the range of approximately 35 dB to approximately 45 dB. It should be appreciated that the idle acoustics may be controlled such that given additional seeking acoustics in the range of approximately 0 dB to approximately 5 dB, overall seeking acoustics fall below approximately 40 dB, which is considered to be a preferred level. For other disk drives, e.g., 3.5 inch disk drives, the additional seeking acoustics may fall within a different range than the additional seeking acoustics associated with 5.25 inch disk drives.

Figure 1:
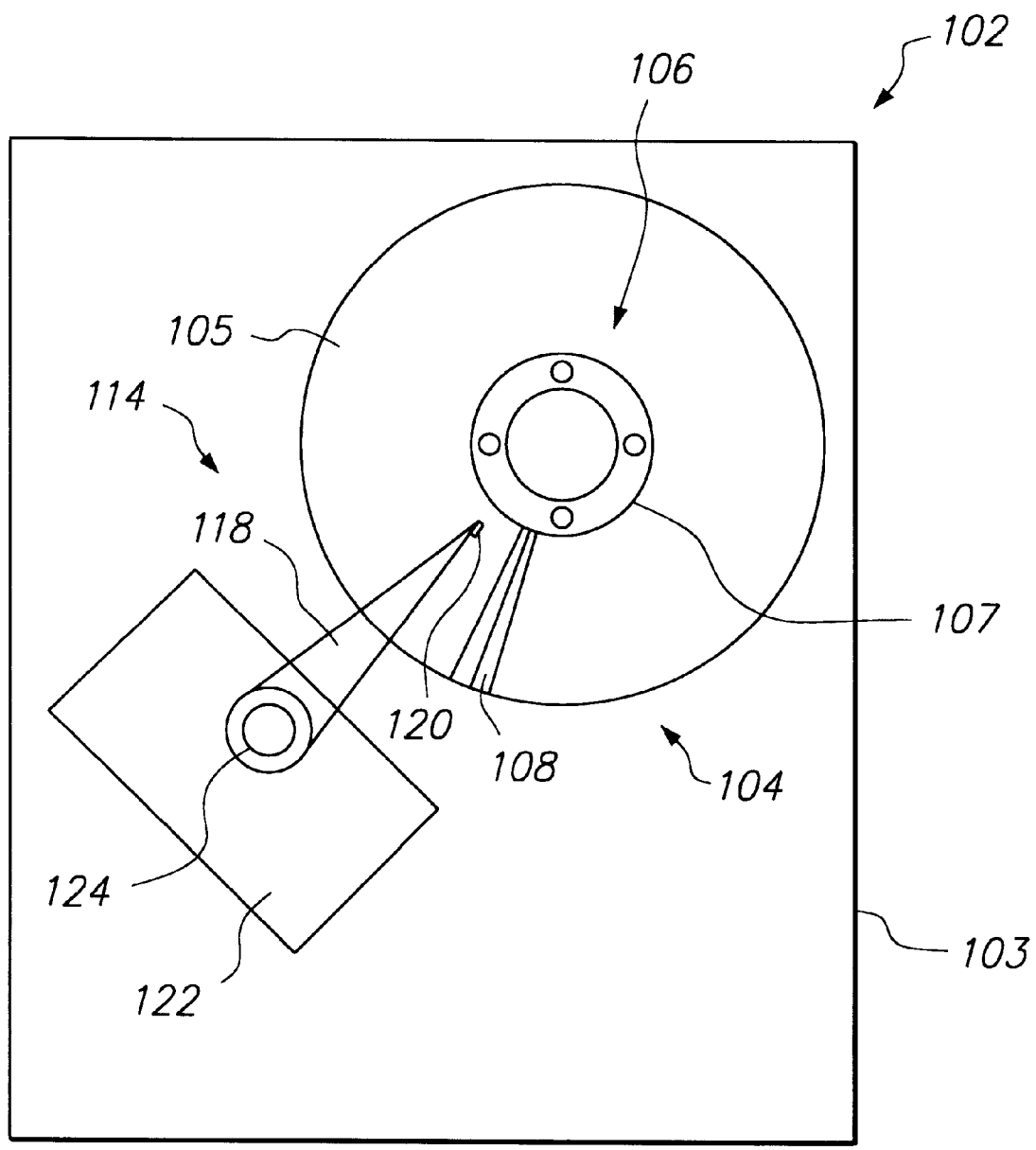
FIG. 1 is a diagrammatic representation of a disk drive assembly.
Figure 3A:
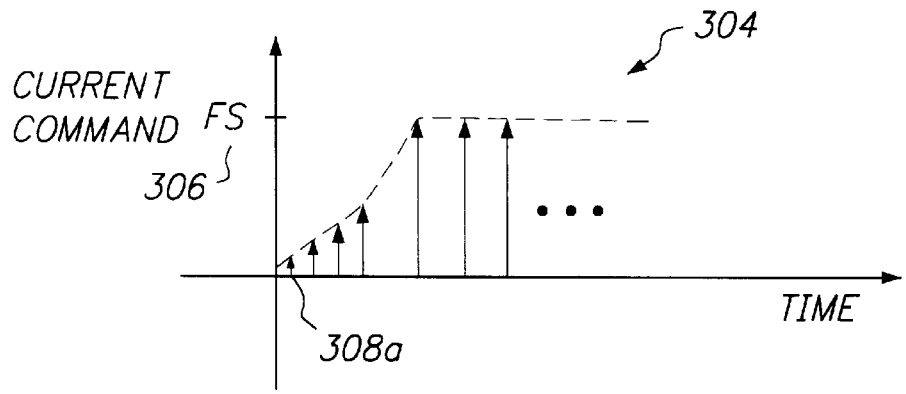
FIG. 3a is a graphical representation of a relationship between a current command which includes current command samples and time in accordance with an embodiment of the present invention.

With reference to FIG. 3a, the creation of a current command which incorporates pre-specified current shaping commands prior to sending at least one full scale current command will be described in accordance with an embodiment of the present invention. In the described embodiment, a current command profile 304, which is inputted to a D/A converter or a PWM and, ultimately, a power amplifier, eventually reaches a full scale level 306. Typically, full scale level 306 corresponds to the maximum seek current the power amplifier may produce. In other words, full scale current command 306 typically corresponds to any current command that causes the power amplifier to saturate. As will be appreciated by those skilled in the art, saturating the power amplifier allows the seek time of a rigid system associated with performing a seek to be substantially minimized. By smoothing out the rise of current command profile 304 to full scale level 306, the magnitude of noise associated with abrupt changes in current may be reduced, thereby reducing the additional seeking acoustics. However, it should be appreciated that full scale level 306 may instead, in some embodiments, correspond to a maximum value which is limited by a particular servo algorithm. Such a maximum value may be lower than a value needed to cause the power amplifier to saturate.

Figure 3B:
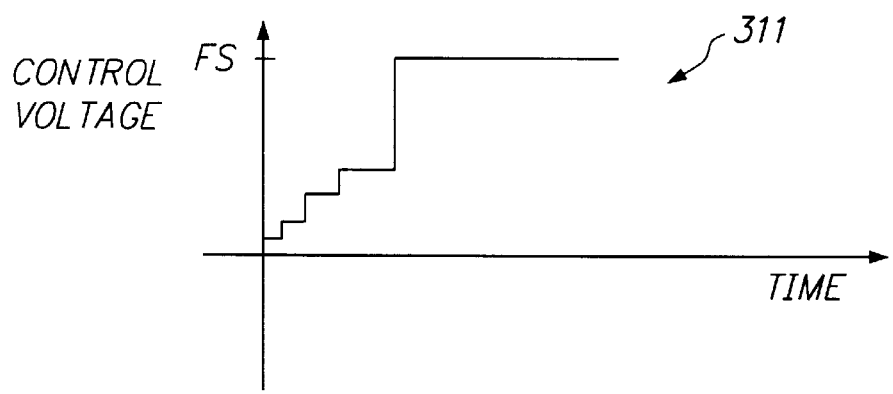
FIG. 3b is a graphical representation of a relationship between a control voltage, generated using the current command of FIG. 3a, and time in accordance with an embodiment of the present invention.
Figure 3C:
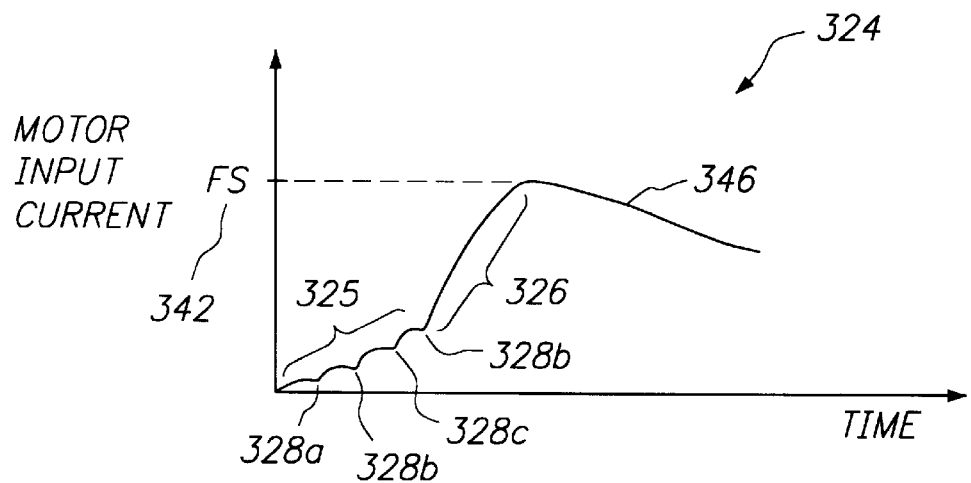
FIG. 3c is a graphical representation of a relationship between a motor input current, generated by the current command which includes current command shaping as shown in FIG. 3a, and time in accordance with an embodiment of the present invention.

Pre-specified current shaping command samples 308 are incorporated into current command profile 304 to give a resultant seek current waveform a relatively smooth initial rise, as will be discussed below with respect to FIG. 3c. In general, the number of pre-specified current shaping command samples 308 may be widely varied. By way of example, the number of pre-specified current shaping command samples 308 may be in the range of approximately one sample to approximately four samples, although it should be appreciated that the number may also be much higher. As shown, in the described embodiment, the number of pre-specified current shaping command samples 308 is four. In some embodiments, a fourth pre-specified current command sample may be approximately equal to full scale level 306 and, hence may be considered to be the saturation sample, since the last pre-specified current shaping command sample would then be the current command value that saturates a power amplifier.

While pre-specified current command samples 308 may take any suitable value and, further, may be spaced apart in a variety of different intervals with respect to time, pre-specified current command samples 308 are typically positioned to provide a concave beginning section 309 to current command profile 304. In some embodiments, pre-specified current command samples 308 may be arranged such that the slope of an initial rise of a resultant seek current is arranged to match the slope of a "main" rise of the resultant seek current commanded by full scale current commands.

Values associated with pre-specified current shaping command samples 308 are generally chosen using an open-loop process. Specifically, pre-specified current shaping command samples 308 may effectively be arbitrarily chosen, as the use of pre-specified current shaping command samples 308 is arranged to minimize substantially all high frequency motion associated with a seek. In other words, resonance knowledge of the overall disk drive is not necessary to create current command profile 304 for input into a power amplifier. This is due to the fact that the use of pre-specified current shaping command samples 308 is effective to minimize substantially all high frequency motion, e.g. high frequencies within the bulk of the audible range of frequencies. By way of example, substantially all high frequencies in the range of approximately 1000 Hz to approximately 10 kHz may be removed.

The use of pre-specified current shaping command samples 308 allows current command profile 304 to be shaped as desired, and inputted to a power amplifier without being post-processed. In other words, current command profile 304 may be inputted directly into a power-amplifier without first passing through a filter or an input shaper. Since the implementation of filters and input shapers generally requires knowledge of the resonant modes of a controlled system, e.g., a disk drive system, the elimination of filters and input shapers renders it unnecessary to have knowledge of resonant modes of the controlled system in order to keep the resonant modes from being excited.

Once current command profile 304 and, hence, pre-specified current shaping command samples 308, pass through a D/A converter or a PWM, a control voltage is generated. FIG. 3b is a graphical representation of a relationship between a control voltage and time in accordance with an embodiment of the present invention. A control voltage profile 311 is essentially the analog version of current command profile 304 of FIG. 3a. That is, control voltage profile 311 is a "staircase" version of the discrete samples in current command profile 304.

Control voltage profile 311 is inputted into a power amplifier in order to generate a motor input current, i.e., a n actual real current or a seek current. FIG. 3b is a graphical representation of a relationship between a motor input current, generated by the current command of FIG. 3a, and time in accordance with an embodiment of the present invention. In the described embodiment, a motor input current profile 324 includes a concave slope 325 and a convex slope 326.

As shown, seek current values 328, each of which corresponds to an associated pre-specified current shaping command sample 308 of FIG. 3a, define concave slope 325. Specifically, seek, or real, current values 328a–328d, which correspond to pre-specified current shaping command samples 308a–328d, respectively, define concave slope 325. Seek current value 328e, which corresponds to full-scale current command sample 328e, defines convex slope 326 through the natural saturation of the power amplifier. Seek current value 328d, in one embodiment, is further known as an inflection point, or the point at which motor input current profile 324 switches from a substantially concave shape to a substantially convex shape. In other embodiments, such an inflection point may be defined between seek current values 328c and 328d.

In general, an overall beginning slope 330 of motor input current profile 324 has a shape which may be approximated as being somewhat exponential in shape, and may, in one embodiment, correspond to a one-third stroke of a seek. By way of example, overall beginning slope 330 may have a bi-exponential shape in which a concave exponential is followed by a convex exponential. It should be appreciated that the shape of overall beginning slope 330 may be dependent upon the number of and the location of seek current values 328. Therefore, the shape of overall beginning slope 330 is determined by the number of and the positioning of the current shaping command samples which are associated with seek current values 328.

An approximately bi-exponential shape, e.g., a two-stage cascaded exponential shape, for overall beginning slope 330 allows motor input current profile 324 to have a smooth rise without sudden changes. The smooth rise effectively lacks high frequency components. Hence, it is unnecessary to process command current 304 of FIG. 3a using a filter or an input shaper prior to sending command current 304 through a D/A converter and a power amplifier. In other words, high frequency components are essentially removed from motor input current profile 324 or a motor input current wave form. In particular, resonant frequencies in the acoustic range, e.g., in the range of approximately 1000 Hz to approximately 10 kHz, will generally not be excited. However, it should be appreciated that resonant frequencies which are beyond the acoustic range may also be rendered unexcitable.

Motor input current profile 324 reaches a full scale level 342 which, in the described embodiment, corresponds to a maximum current which the power amplifier may provide using command current 304 of FIG. 3a. Once motor input current profile 324 reaches full scale level 342, a declining saturation curve 346 is evident in motor input current profile 324. As previously described, a power amplifier is typically operated at a saturation level in order to allow a seek to be performed relatively quickly, thereby minimizing seek time.

In general, a full scale current level is requested by the servo system associated with an HDA when a seek is requested. In one embodiment, when a seek is to occur, instead of immediately requesting a full scale current, pre-specified current command samples are inputted, i.e., fed forward, into a power amplifier to create a seek current which has a smooth rise with no abrupt, initial change of slope. Without an abrupt initial change of slope in the seek current, the associated additional seeking acoustics may be reduced.

Figure 4:
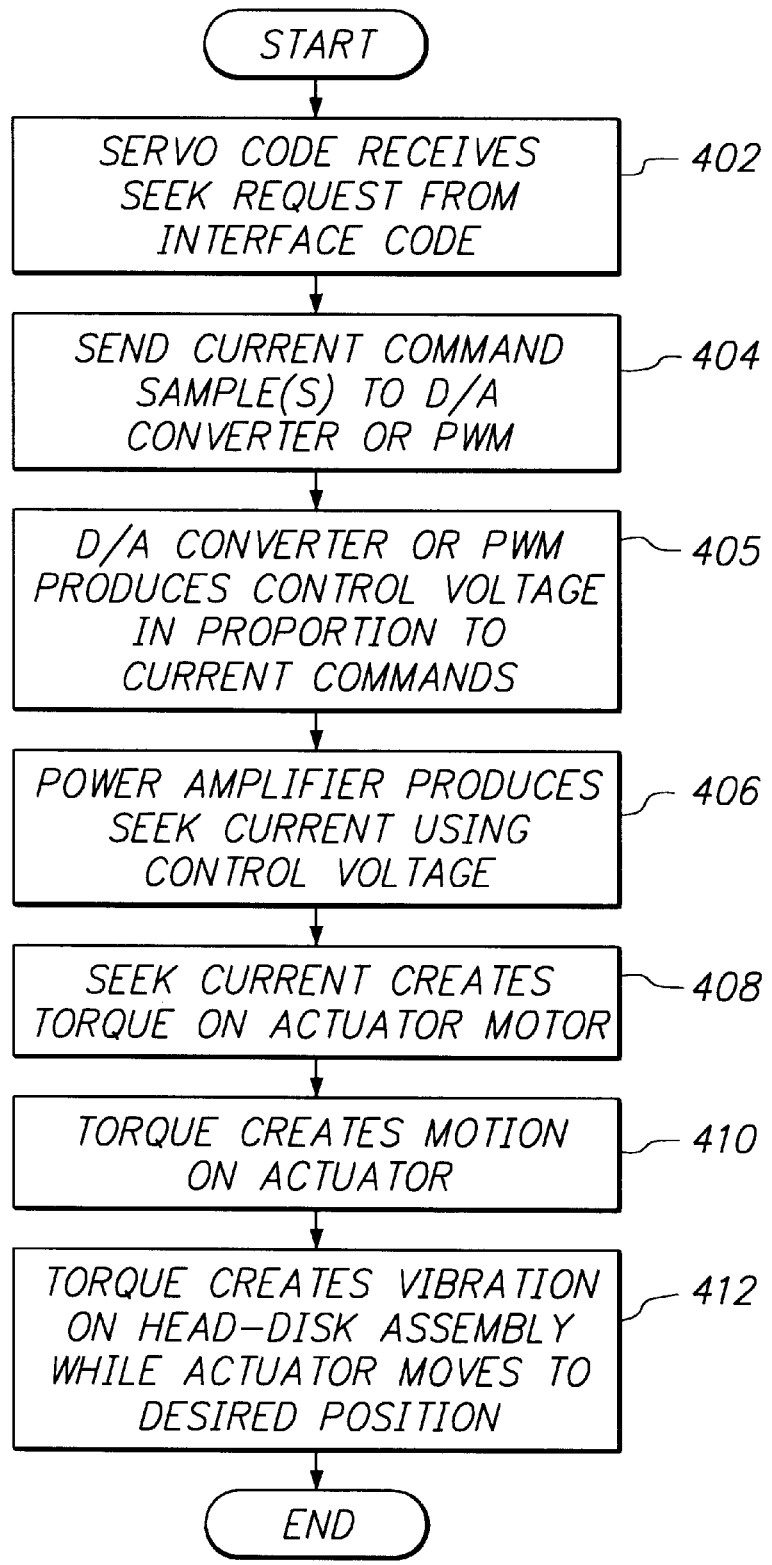
FIG. 4 is a process flow diagram which illustrates the steps associated with performing a seek in accordance with an embodiment of the present invention.

With reference to FIG. 4, one process of performing a seek within an HDA, or a disk drive, will be described in more detail in accordance with an embodiment of the present invention. It should be understood that a request for a seek is typically created by interface code when it is necessary to reposition a disk drive head. For example, when data is to be written to or retrieved from a disk drive platter, a seek request is created by interface code essentially to command the disk drive head to move with respect to the disk drive platter. The process of performing a seek begins at step 402 in which a seek request is received in servo code from interface code. That is, the seek request created by the interface code in response to a command to retrieve or write data is passed to servo code associated with the HDA. As will be appreciated by those skilled in the art, servo code is code that is arranged to operate circuitry associated with creating and sending a current command to a power amplifier which feeds an actuator motor.

After the seek request is received by the servo code, current command samples are sent to the power amplifier in step 404. In other words, samples of the current command, as described above with respect to FIG. 3a, are generated using the servo code, and are sent to the power amplifier, typically via a D/A converter or a PWM. In the described embodiment, the samples of the current command are sent directly from the servo code to a D/A converter and, finally, to the power amplifier. The samples of the current shaping command samples are typically not dependent upon the resonance conditions of the overall HDA. Although the number of current shaping command samples may be widely varied, in one embodiment, the number of current shaping command samples may be in the range of approximately one sample to approximately four samples. In other embodiments, the number of current shaping command samples may be more than approximately four.

The D/A converter produces a control voltage which is proportional to the current commands, and feeds the control voltage to the power amplifier in step 405. As will be appreciated by those skilled in the art, in lieu of a D/A converter or a PWM, substantially any suitable device may be used to convert current commands into an input for the power amplifier.

The power amplifier uses the current command to send a current, i.e., seek or motor input current to the actuator motor in step 406. Specifically, the current command, including the current shaping command samples, are amplified by the power amplifier and sent to the actuator motor, e.g., the VCM. In the described embodiment, since the current shaping command samples were not selected based on the dynamics of the HDA, the process of generating the current shaping command samples is an open-loop process.

In step 408, the seek current is used to create a torque on the actuator motor, as will be appreciated by those skilled in the art. The torque is used to create motion on the actuator in step 410. That is, the torque created on the actuator motor is used to move, i.e., rotate, the actuator and, hence, a disk drive head that is coupled to the actuator. Specifically, the actuator motor is used to move the disk drive head over a disk drive platter to a desired position, thereby performing a seek.

In addition to creating motion on the actuator to allow the actuator to perform a seek in step 410, the torque also creates vibrations on the overall HDA in step 412 while the actuator is moved to a desired position. Typically, the vibrations created contribute to the seeking acoustics. However, in the described embodiment, the use of current command samples reduces the additional seeking acoustic and, as a result, the total amount of vibration on the HDA as well. The seek time, or the amount of time it takes for the actuator to move to the desired position, is not significantly affected by the use of current shaping command samples, e.g., the seek time is essentially not increased by the use of current shaping command samples. Once the actuator is moved to a desired position, the process of performing a seek is completed.

Although only a few embodiments of the present invention have been described, it should be understood that the present invention may be embodied in many other specific forms without departing from the spirit or scope of the invention. By way of example, although the present invention has been described in terms of reducing the noise at the beginning, e.g., at the one-third stroke, of a seek, the present invention may generally be applied to reduce noise at substantially any section of a seek. The use of samples of pre-specified current shaping commands in other sections of a seek may allow an overall motor input current profile to have smooth slopes, thereby reducing the overall associated seeking acoustics.

Further, the number of current shaping command samples used to create an input current to an actuator motor may be widely varied. For example, although the number of current shaping command samples has been described as being in the range of approximately one to approximately four, the number of current shaping command samples may generally be much higher without departing from the spirit or the scope of the present invention. The saturation curve of a power amplifier is such that the use of a few current shaping command samples, e.g., approximately one to approximately four, is typically sufficient to generate a smooth motor input current profile. However, more current shaping command samples may be used in the event that more control over the shape of the motor input current profile. In addition, in some cases, the use of more current shaping command samples may allow more high frequency components to be removed from a corresponding seek current profile.

Current shaping command samples have been described as being used to create a substantially exponentially shaped beginning slope for a corresponding seek current. For example, current shaping command samples may create a bi-exponential slope, e.g., a two-stage cascaded exponential slope, as mentioned above. In general, current shaping command samples may be used to create any suitable beginning slope for a corresponding seek current. Suitable beginning slopes include, but are not limited to, smooth, non-linear slopes.

The steps associated with performing a seek may generally be widely varied, e.g., specific steps may be reordered or altered. In addition, steps may also be removed or added without departing from the spirit or the scope of the present invention.

Although the present invention has been described in terms of implementation with respect to 5.25 inch disk drives, it should be appreciated that the present invention may be implemented with respect to any suitable disk drive. For example, the present invention may be implemented for use in 3.5 inch disk drives. More generally, the present invention may be applied to any suitable physical system which requires current shaping.

While the process of using current shaping command samples to generate a motor input current has been described as being an open-loop process, it should be appreciated that in some instances, the process of using current command samples to generate a motor input current may be a closed-loop process. By way of example, servo feedback information may be used to determine the relative placements of the current command samples, as well as the magnitudes of the current command samples without departing from the spirit or the scope of the present invention. Therefore, the present examples are to be considered as illustrative and not restrictive, and the invention is not to be limited to the details given herein, but may be modified within the scope of the appended claims.

What is claimed is:

1. A method for reducing overall seeking acoustics in a disk drive apparatus, the method comprising:
   sending at least one current shaping command sample to a power amplifier;
   sending a full scale current command sample to the power amplifier, the full scale current command sample being sent to the power amplifier after the at least one current shaping command sample is sent to the power amplifier; and
   generating a seek current wave form using the power amplifier and the at least one current shaping command sample, wherein the at least one current shaping command sample is arranged to create a smooth, substantially non-linear bi-exponential initial rise in the seek current wave form.

2. A method as recited in claim 1 wherein the full scale current command sample is arranged to cause the power amplifier to saturate.

3. A method for reducing overall seeking acoustics in a disk drive apparatus, the method comprising:
- sending at least one current shaping command sample to the power amplifier;
- sending a full scale current command to the power amplifier, the full scale current command sample being sent to the power amplifier after the at least one current shaping command sample is sent to the power amplifier, wherein the at least one current shaping command sample and the full scale current command sample are sent through a circuit that is arranged to produce a control voltage from the at least one current shaping command sample and the full scale current command sample prior to being sent to the power amplifier, the control voltage being arranged to be directly sent to the power amplifier; and
- generating a seek current wave form using the power amplifier and the at least one current shaping command sample, wherein the at least one current shaping command sample is arranged to create a smooth, substantially non-linear initial rise in the seek current wave form.

4. A method as recited in claim 1 wherein the smooth, substantially non-linear initial rise is a smooth, two-stage cascaded exponential rise.

5. A method for reducing overall seeking acoustics in a disk drive apparatus, the method comprising:
- sending at least one current shaping command sample to the power amplifier, wherein sending at least one current shaping command sample to a power amplifier includes sending in the range of about one to about four current shaping command sample to a power amplifier;
- sending a full scale current command sample to the power amplifier, the full scale current command sample being sent to the power amplifier after the at least one current shaping command sample is sent to the power amplifier; and
- generating a seek current wave form using the power amplifier and the at least one current shaping command sample, wherein the at least one current shaping command sample is arranged to create a smooth, substantially non-linear initial rise tin the seek current wave form.

6. A method as recited in claim 5 wherein sending at least one current shaping command sample to a power amplifier includes sending four current shaping command samples to the power amplifier, wherein a first current shaping command sample selected from the four current shaping command samples defines an inflection point in the seek current wave form and the full scale current command sample defines a saturation value in the seek current wave form for the power amplifier.

7. A method as recited in claim 6 wherein the initial rise in the seek current wave form is substantially concave in shape before the inflection point and substantially convex in shape after the inflection point.

8. A method for processing a seek request on a disk drive apparatus, the disk drive apparatus including a power amplifier, an actuator motor, and an actuator assembly, wherein the actuator motor is arranged to cause the actuator assembly to move, the method comprising:
- creating the seek request in interface code;
- sending the seek request to servo code associated with the disk drive apparatus;
- receiving the seek request on the servo code;
- sending at least one current command sample from the servo code to the power amplifier, wherein the at least one current command sample is substantially independent of resonance conditions associated with the disk drive apparatus;
- generating a current wave form using the at least one current command sample and the power amplifier; and
- sending the current wave form to the actuator motor, wherein the current wave form is arranged to cause the actuator motor to move the actuator assembly.

9. A method as recited in claim 8 wherein sending the current wave form to the actuator motor includes:
- creating a torque using the actuator motor, wherein the torque causes the actuator assembly to move.

10. A method as recited in claim 9 wherein the torque creates an additional seeking acoustic associated with the disk drive apparatus, the amount of the additional seeking acoustic being dependent upon an initial rise in the current wave form sent to the actuator motor.

11. A method as recited in claim 10 wherein the initial rise in the current wave form is arranged to minimize the amount of the additional seeking acoustic.

12. A method as recited in claim 10 wherein the additional seeking acoustic is created while the actuator assembly moves.

13. A method as recited in claim 8 further including:
- sending a full scale current command sample from the servo code to the power amplifier after the at least one current command sample is sent from the servo code to the power amplifier.

14. A method as recited in claim 13 further including:
- generating the at least one current command sample and the full scale current command sample using the servo code.

15. A method for processing a seek request on a disk drive apparatus, the disk drive apparatus including a power amplifier, an actuator motor, and an actuator assembly, wherein the actuator motor is arranged to cause the actuator assembly to move, the method comprising:
- receiving the seek request on servo code associated with the disk drive apparatus;
- generating at least one current command sample and a full scale current command sample using the servo code;
- sending the at least one current command sample from the servo code to the power amplifier;
- generating a current wave form using the at least one current command sample and the power amplifier;
- sending the current wave form to the actuator motor, the current wave form being arranged to cause the actuator motor to move the actuator assembly; and
- sending the full scale current command sample from the servo code to the power amplifier after the at least one current command sample is sent from the servo code to the power amplifier, wherein the at least one current command sample and the full scale current command are sent from the servo code to a circuit arranged to create a control voltage prior to being sent to the power amplifier.

16. A disk drive apparatus comprising:
- a platter;
- an actuator motor;
- an actuator assembly coupled to the actuator motor, wherein the actuator motor is arranged to move the actuator assembly over the platter;
- a servo mechanism arranged to generate at least one current command sample, the servo mechanism further being arranged to generate a full scale current command; and a power amplifier, the power amplifier being coupled to the servo mechanism, wherein the power amplifier is arranged to receive the at least one current command sample and to use the at least one current command sample to generate an input current wave form to drive the actuator motor, wherein the at least one current command sample is arranged to create a smooth, approximately bi-exponential initial rise in the input current wave form.

17. A disk drive apparatus as recited in claim 16 wherein the smooth initial rise in the input current wave form is arranged to reduce overall seeking acoustics associated with the disk drive apparatus.

18. A disk drive apparatus as recited in claim 17 wherein the smooth initial rise in the input current wave form is substantially exponential in shape.

19. A disk drive apparatus comprising:

a platter;

an actuator motor;

an actuator assembly coupled to the actuator motor, wherein the actuator motor is arranged to move the actuator assembly over the platter;

a servo mechanism arranged to generate at least one current command sample, the servo mechanism further being arranged to generate a full scale current command, wherein the servo mechanism is arranged to generate the at least one current command sample without knowledge of resonant modes associated with the disk drive apparatus; and a power amplifier the power amplifier being coupled to the servo mechanism, wherein the power amplifier is arranged to receive the at least one current command sample and to use the at least one current command sample to generate an input current wave form to drive the actuator motor, wherein the at least one current command sample is arranged to create a smooth initial rise in the input current wave form.

20. A method as recited in claim 1 wherein the smooth, substantially non-linear, bi-exponential initial rise includes a concave exponential followed by a convex exponential.

21. A method as recited in claim 8 wherein the current command sample is a current shaping command sample.

* * * * *